United States Patent
Lu et al.

(10) Patent No.: US 10,637,337 B2
(45) Date of Patent: Apr. 28, 2020

(54) AUTOMATIC TORQUE-ADJUSTABLE SPEED-CHANGING MOTOR FOR ELECTRIC PEDICAB

(71) Applicant: JIANGSU JINPENG VEHICLE CO., LTD., Xuzhou (CN)

(72) Inventors: Shimin Lu, Xuzhou (CN); Dandan Chen, Xuzhou (CN); Luoluo Zhang, Xuzhou (CN); Hongjun Zhu, Xuzhou (CN); Hui Zhao, Xuzhou (CN); Wenqing Xu, Xuzhou (CN)

(73) Assignee: JIANGSU JINPENG VEHICLE CO., LTD., Jiangsu (CN)

( * ) Notice: Subject to any disclaimer, the term of this patent is extended or adjusted under 35 U.S.C. 154(b) by 0 days.

(21) Appl. No.: 16/076,448

(22) PCT Filed: May 16, 2017

(86) PCT No.: PCT/CN2017/084527
§ 371 (c)(1),
(2) Date: Aug. 8, 2018

(87) PCT Pub. No.: WO2018/113176
PCT Pub. Date: Jun. 28, 2018

(65) Prior Publication Data
US 2019/0312496 A1    Oct. 10, 2019

(30) Foreign Application Priority Data

Dec. 23, 2016 (CN) .......................... 2016 1 1204911

(51) Int. Cl.
*H02K 7/12* (2006.01)
*H02K 16/00* (2006.01)
*B62M 6/40* (2010.01)

(52) U.S. Cl.
CPC ............. *H02K 16/005* (2013.01); *B62M 6/40* (2013.01); *H02K 7/12* (2013.01)

(58) Field of Classification Search
CPC .......... H02K 16/005; H02K 7/12; B62M 6/40
(Continued)

(56) References Cited

U.S. PATENT DOCUMENTS 5,821,710 A * 10/1998 Masuzawa ............. H02K 16/02
                                                    318/400.41
6,492,753 B2 * 12/2002 Zepp .................... H02K 21/024
                                                    310/114

(Continued)

FOREIGN PATENT DOCUMENTS

CN       101662181 A     3/2010
CN       102355116 A     2/2012
(Continued)

OTHER PUBLICATIONS

PCT/CN2017/084527 International Search Report and Written Opinion, dated Sep. 12, 2017.

*Primary Examiner* — John K Kim
(74) *Attorney, Agent, or Firm* — Thomas Horstemeyer, LLP

(57) ABSTRACT

An automatically variable torque and speed motor for electrical tricycles is disclosed, and the motor rotor assembly of which comprises fixed rotors and rotary rotors arranged adjacently in turn along the axis of the motor shaft. Staggered pole pieces on the surfaces of the fixed rotor and the rotary rotor form a staggered angle α along the circumference. The support of the rotary rotor comprises a revolving support ring and two fixed side discs which are respectively arranged on the two sides of the revolving support ring. An elastic compression part is arranged in the inner cavity of the revolving support ring along the revolving direction. The elastic compression part has one end arranged at the inner (Continued)

circle of the revolving support ring and the other end arranged on the side wall, facing the inner cavity of the revolving support ring, of one of the fixed side discs. The present invention can adjust the speed and torque according to the load situations of the whole electrical tricycle. It can run in a highly efficient range in the case of low load, and automatically increases the output torque in the case of high load. The power output of the motor of the electrical tricycle is more reasonable, and the reliability of key parts and components of the electrical tricycles is enhanced, and the service life of the whole electrical tricycles is prolonged; and the whole electrical tricycle becomes more energy-saving and environmentally-friendly.

13 Claims, 4 Drawing Sheets

(58) Field of Classification Search
USPC .......................................................... 310/114
See application file for complete search history.

(56) References Cited

U.S. PATENT DOCUMENTS

| | | | | |
|---|---|---|---|---|
| 6,771,000 | B2* | 8/2004 | Kim | F01D 15/10 |
| | | | | 310/156.16 |
| 6,833,646 | B2* | 12/2004 | Joong | B60K 6/26 |
| | | | | 310/114 |
| 6,841,911 | B2* | 1/2005 | Kim | H02K 16/02 |
| | | | | 310/114 |
| 6,844,647 | B2* | 1/2005 | Horber | H02K 21/16 |
| | | | | 310/112 |
| 2004/0021390 | A1* | 2/2004 | Kim | H02K 16/02 |
| | | | | 310/191 |

FOREIGN PATENT DOCUMENTS

| | | |
|---|---|---|
| CN | 106505813 A | 3/2017 |
| CN | 206259831 U | 6/2017 |
| JP | 2011097815 A | 5/2011 |

* cited by examiner

AUTOMATIC TORQUE-ADJUSTABLE SPEED-CHANGING MOTOR FOR ELECTRIC PEDICAB

CROSS-REFERENCE TO RELATED APPLICATIONS

This application is a 371 U.S. National Phase of PCT International Application No. PCT/CN2017/084527, filed on May 16, 2017, which claims benefit and priority to Chinese patent application No. 201611204911.1, filed on Dec. 23, 2016. Both of the above-referenced applications are incorporated by reference herein in their entirety.

BACKGROUND OF THE INVENTION

Technical Field

The present invention relates to an automatically variable torque and speed motor for electric tricycles, belonging to the manufacturing field of electric vehicles.

Description of Related Art

Existing motors for electric tricycles usually have a single function and have no variable torque and speed function. When an electric tricycle is running with a very large load, the output power of the motor will rise to increase the output torque of the motor. However, in this process, the revolving speed declines as the output power increases. In such circumstances, the prolonging of the overloading time (the working efficiency of the motor is relatively low in such circumstances) tends to cause serious heating and even damage to the motor, reducing the service life of the motor and lowering the reliability and stability of parts and components of the electric vehicle. In addition, when the electric tricycle is idle-running (with a relatively small load in such circumstances), the revolving speed of a common motor is relatively low, and the common motor runs at a low efficiency and also prolongs the running time between two places.

SUMMARY OF THE INVENTION

Aiming at problems in the prior art, the objective of the present invention is to provide an automatically variable torque and speed motor for electric tricycles, which automatically adjusts the speed and torque according to the load situations of the whole electric tricycle, makes the power output of the motor more reasonable, effectively enhances the revolving speed of the motor at a low load, fulfills the aims of improving the running efficiency (driving the motor to run in a high efficiency range), enhancing the vehicle speed and saving running time. The present invention can also avoid an overly large motor current and overly high temperature rise when the electric tricycle is heavily loaded and improve safety and stability in use.

In order to fulfill the objective, the present invention employs the following technical scheme: an automatically variable torque and speed motor for electrical tricycles, which includes a motor rotor assembly; the motor rotor assembly includes a motor shaft, fixed rotors and rotary rotors; the fixed rotors and the rotary rotors are arranged adjacently in turn along the axis of the motor shaft; the fixed rotor and the rotary rotor are equal in diameter; staggered pole pieces are arranged in the same manner around the circumferential surface of the support of the fixed rotor and around the circumferential surface of the support of the rotary rotor; the staggered pole pieces include a plurality of N poles and S poles which are circumferentially arranged in an alternative way in turn on the excircle of each one of the supports; the staggered pole pieces on the surface of the fixed rotor and the staggered pole pieces on the surface of the rotary rotor form a staggered angle α along the circumference; the support of the rotary rotor includes a revolving support ring and two fixed side discs which are respectively arranged on the two sides of the revolving support ring, wherein the two fixed side discs are both bushed on the motor shaft and are connected together through a bolt I, an elastic compression part is arranged in the inner cavity of the revolving support ring along the revolving direction, and the elastic compression part has one end arranged at the inner circle of the revolving support ring, and the other end arranged on the side wall, facing the inner cavity of the revolving support ring, of one of the fixed side discs.

Further, the revolving support ring is provided with a C-shaped limiting mounting platform which extends toward the inner cavity thereof; the bolt I passes along the direction parallel to the motor shaft through the locating bushing which is arranged in the inner cavity of the revolving support ring; the elastic compression part has one end arranged in the C-shaped cavity of the C-shaped limiting mounting platform, and has the other end fixed at the fixing portion of the fixed side discs, and the said fixing portion is extending from the fixed side discs toward the inner cavity of the revolving support ring; and the back of the C-shaped limiting mounting platform contacts the locating bushing of bolt I.

Preferably, the revolving support ring includes a middle support ring and side support rings that clamp the middle support ring from two sides, and the side support rings and the middle support ring are fixed and superimposed together through a plurality of bolts II.

Preferably, the elastic compression part is a cylindrical spiral compression spring; the fixed portion is a spring support bushing which is arranged on a surface of the fixed side discs and the said surface is towards the inner cavity of the revolving support ring; the cylindrical spiral compression spring is arranged along the revolving direction of the revolving support ring, and the cylindrical spiral compression spring has one end arranged in the C-shaped cavity of the C-shaped limiting mounting platform, and the other end fixed in the countersink of the spring support bushing.

Preferably, two groups of the cylindrical spiral compression springs, the spring support bushings, the C-shaped limiting mounting platforms and the locating bushings are provided and respectively arranged in the inner cavity of the revolving support ring, symmetrical to the motor shaft.

Preferably, the circumferentially staggered angle α formed between the staggered pole pieces on the surface of the fixed rotor and the staggered pole pieces on the surface of the rotary rotor is 15°.

Preferably, the fixed side discs are embedded on the revolving support ring; a wear ring is arranged between the revolving support ring and each one of the fixed side discs; each one of the wear rings is clamped and fixed with a groove on the revolving support ring through a protrusion, and the excircle of each one of the fixed side discs is matched and installed on the step of the inner circle of each corresponding one of the wear rings.

Preferably, the side of the middle portion of the fixed side disc, facing the fixed rotor, is provided with an annular locating protrusion which extends towards the fixed rotor.

When the motor is installed first time, the rotary rotor and the fixed rotor deflect by an angle α. At a low load, the revolving speed of the motor can be enhanced by an internal mechanism of the motor to ensure that the motor runs in a highly efficient range, thus enhancing the running efficiency of the whole electric tricycle, and saving running time because the vehicle speed is enhanced. As the load increases, the magnetic field strength of the fixed coil on the motor housing changes, so the rotary rotor can appropriately rotate relative to the fixed rotor. In this way, the revolving speed of the motor is reduced, while the output torque of the motor increases automatically to improve the self-adaption ability of the motor to the load without enhancing the power, thus avoiding an overly large motor current and overly high temperature rise. The power output of the motor of the electric tricycle is more reasonable; the reliability of key parts and components of the electrical tricycle is improved, and the service life of the whole electrical tricycle is prolonged; moreover, the whole electric tricycle becomes more energy-saving and environmentally-friendly.

Figure 1:
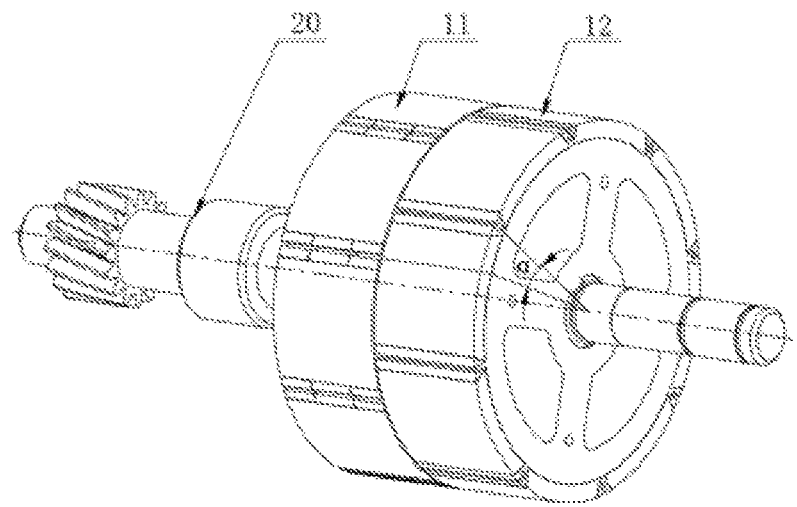
FIG. 1 is the three-dimensional view of the motor rotor assembly of the present invention.
Figure 2:
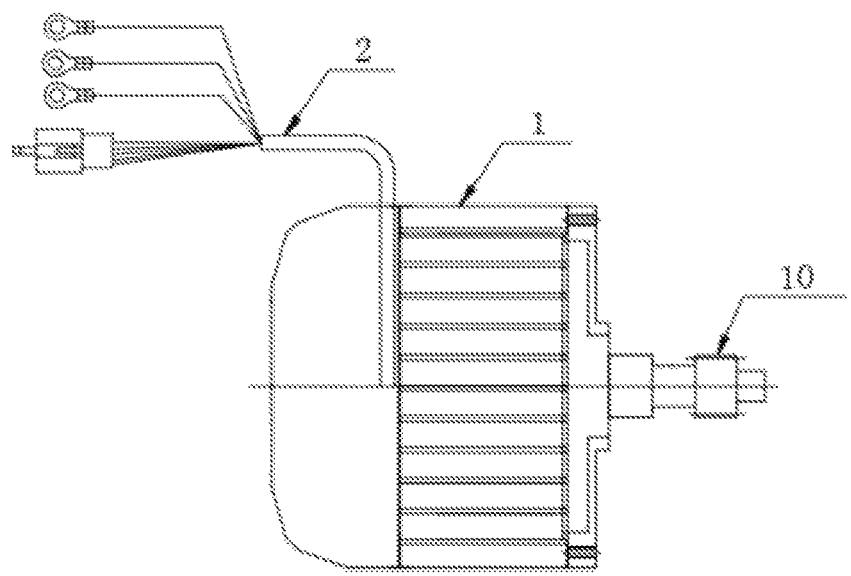
FIG. 2 is the schematic view of the motor rotor assembly of the present invention installed on a motor.
Figure 3:
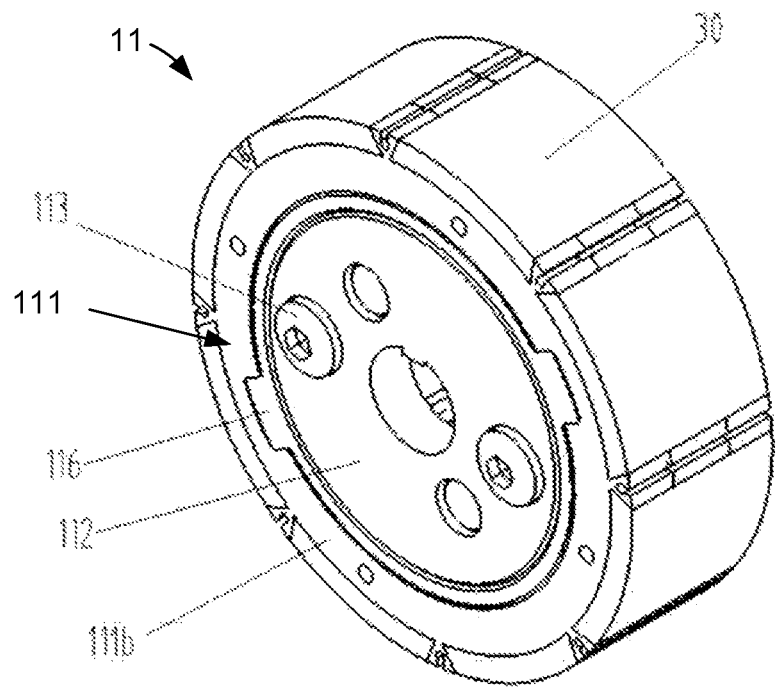
FIG. 3 is the three-dimensional view of the rotary rotor of the present invention.
Figure 4:
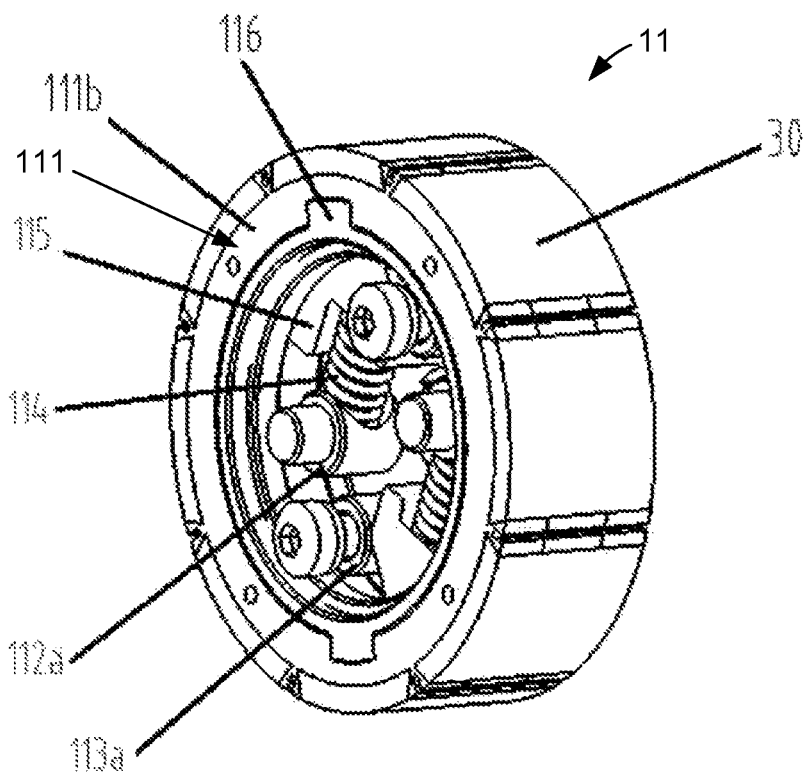
FIG. 4 is the three-dimensional view of the rotary rotor of the present invention, with a fixed side disc on one side removed.
Figure 5:
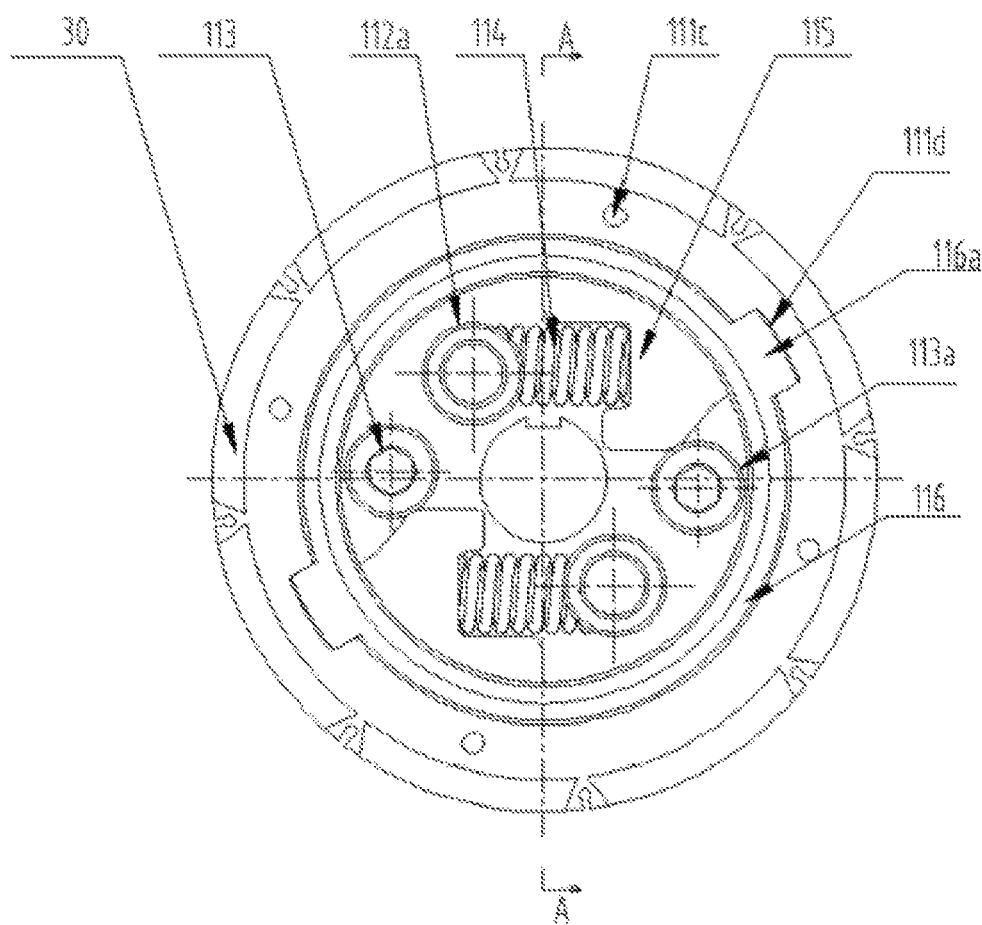
FIG. 5 is the front view of the rotary rotor of the present invention, with a fixed side disc on one side removed.
Figure 6:
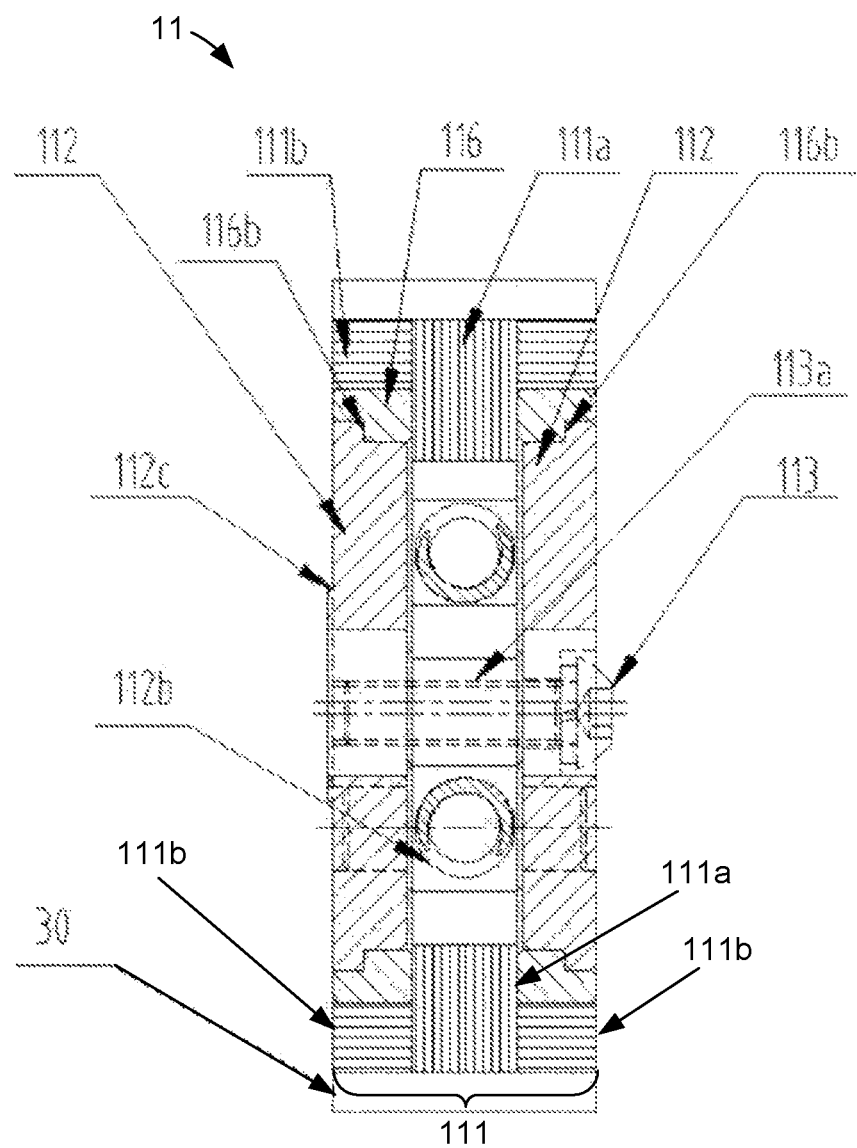
FIG. 6 is the sectional view of FIG. 5 in direction A-A.

As shown in the drawings, 1—motor housing; 2—lead; 10—motor rotor assembly; 11—rotary rotor; 12—fixed rotor; 20—motor shaft; 30—staggered pole piece, 111a—middle support ring; 111b—side support ring; 111c—bolt II; 111d—groove; 112—fixed side disc; 112a—spring support bushing; 112b—countersink; 112c—annular positioning protrusion; 113—bolt I; 113a—locating bushing; 114—elastic compression part; 115—C-shaped limiting mounting platform; 116—wear ring; 116a—protrusion; 116b—mounting step.

DETAILED DESCRIPTION OF THE INVENTION

The present invention is described in further detail in conjunction with the accompanying drawings.

As shown in the figure, an automatically variable torque and speed motor for electrical tricycles includes a motor rotor assembly 10 arranged in the motor housing 1, and a fixed ring is on the inner side wall of the motor housing 1, arranged around the motor rotor assembly 10. The motor rotor assembly 10 includes a motor shaft 20, fixed rotors 12 and rotary rotors 11; the fixed rotors 12 and the rotary rotors 11 are arranged adjacently in turn along the axis of the motor shaft 20. The fixed rotor 12 and the rotary rotor 11 are equal in diameter. Staggered pole pieces 30 are arranged in the same manner around the circumferential surface of the support of the fixed rotor 12 and around the circumferential surface of the support of the rotary rotor 11. The staggered pole pieces 30 include a plurality of N poles and S poles which are circumferentially arranged in turn in an alternative way on the excircle of each one of the supports. The staggered pole pieces 30 on the surface of the fixed rotor 12 and the staggered pole pieces 30 on the surface of the rotary rotor 11 form a staggered angle α along the circumference. The support of the rotary rotor 11 includes a revolving support ring 111 and two fixed side discs 112 which are respectively arranged on the two sides of the revolving support ring 111, wherein the two fixed side discs 112 are both bushed on the motor shaft 20 and are connected together through bolt I 113, an elastic compression part 114 is arranged in the inner cavity of the revolving support ring 111 along the revolving direction, and the elastic compression part 114 has one end arranged at the surface of the inner circle of the revolving support ring 111, and the other end arranged on the side wall, facing the inner cavity of the revolving support ring 111, of one of the fixed side discs 112.

Further, the revolving support ring 111 is provided with a C-shaped limiting mounting platform 115 which extends toward the inner cavity thereof; the bolt I 113 passes along the direction parallel to the motor shaft 20 through the locating bushing 113a which is arranged in the inner cavity of the revolving support ring 111; the elastic compression part 114 has one end arranged in the C-shaped cavity of the C-shaped limiting mounting platform 115, and has the other end fixed at the fixing portion of the fixed side discs 112, and the said fixing portion is extending from the fixed side discs 112 toward the inner cavity of the revolving support ring 111; and the back of the C-shaped limiting mounting platform 115 contacts the locating bushing 113a of bolt I 113. When the load increases and the revolving support ring 111 rotates relative to the fixed side discs 112, the C-shaped limiting mounting platform 115 pushes one end of the elastic compression part 114 in the C-shaped cavity thereof to force the elastic compression part 114 to deform; when the elastic compression part 114 is not stressed, the back of the C-shaped limiting mounting platform 115 directly leans against the locating bushing 113a, avoiding reverse rotation caused by an accident.

Preferably, the revolving support ring 111 includes a middle support ring 111a and side support rings 111b that clamp the middle support ring 111a from two sides, and the side support rings 111b and the middle support ring 111a are fixed and superimposed together through a plurality of bolts II 111c. The revolving support ring 111 arranged in a combined way brings convenience in daily maintenance, and a plurality of light parts and components are more easily stored after being dismantled.

Preferably, the elastic compression part 114 is a cylindrical spiral compression spring; the fixed portion is a spring support bushing 112a which is arranged on a surface of the fixed side discs 112 and the said surface is towards the inner cavity of the revolving support ring 111; the cylindrical spiral compression spring is arranged along the revolving direction of the revolving support ring 111, and the cylindrical spiral compression spring has one end arranged in the C-shaped cavity of the C-shaped limiting mounting platform 115, and the other end fixed in the countersink 112b of the spring support bushing 112a. The cylindrical spiral compression spring has a simple and light structure and a long-lasting resilience force, good for overall in-time response and adjustment to load increase.

As a further optimized scheme of the above scheme, two groups of the cylindrical spiral compression springs, spring support bushings 112a, C-shaped limiting mounting platforms 115 and locating bushings 113a are respectively arranged in the inner cavity of the revolving support ring 111, symmetrical to the motor shaft 20. With two groups of rotary structures, the motor runs more stably and reliably, avoiding troubles of frequent repair and replacement.

In the present invention, the circumferentially staggered angle α formed between the staggered pole pieces 30 on the surface of the fixed rotor 12 and the staggered pole pieces 30 on the surface of the rotary rotor 11 is within a range of 13°-17°. Results of multiple lab and field tests show that when a is 15°, it can be ensured that the motor runs in a highly efficient range in the case of low load, and that the torque can steadily increase as the load increases, achieving the best practical application effect.

Preferably, in order to make the overall structure of the rotary rotor 11 more compact, the fixed side discs 112 are embedded on the revolving support ring 111; a wear ring 116 is arranged between the revolving support ring 111 and each one of the fixed side discs 112; each one of the wear rings 116 is clamped and fixed with a groove 111d on the revolving support ring 111 through a protrusion 116a, and the excircle of each one of the fixed side discs 112 is matched and installed on the step 116b of the inner circle of each corresponding one of the wear rings 116. The wear rings 116 make the relative rotation between the revolving support ring 111 and the fixed side discs 112 more smooth, and avoid reduction of the service life caused by direct friction between the revolving support ring 111 and the fixed side discs 112.

Preferably, in order to prevent the rotary rotor 11 from contacting the fixed rotor 12 during rotation, the side of the middle portion of the fixed side disc 112 which faces the fixed rotor 12 is provided with an annular locating protrusion 112c.

The working principle of the present invention is as follows:

At the initial working stage, the motor is powered via lead 2 such that the fixed coil on the inner side of the motor housing 1 is electrified. The magnetic field generated by the fixed coil interacts with the staggered pole pieces 30 on the surface of the motor rotor assembly 10 to force the motor rotor assembly 10 to rotate, and the motor rotor assembly 10 drives the motor shaft 20 to rotate at the same time. The staggered pole pieces 30 on the surface of the fixed rotor 12 and the staggered pole pieces 30 on the surface of the rotary rotor 11 are circumferentially staggered by an angle α, so that the staggered pole pieces 30 on the surface of the fixed rotor 12 and the staggered pole pieces 30 on the surface of the rotary rotor 11 can respectively interact with the electrical magnetic field generated by the fixed coil.

At the same time, the staggered pole pieces 30 on the surface of the fixed rotor 12 and the staggered pole pieces 30 on the surface of the rotary rotor 11 are circumferentially staggered by an angle α, so that the magnetic fields respectively generated by the fixed rotor 12 and the rotary rotor 11 are mutually partly offset. In this way, the overall magnetic field strength of the motor rotor assembly 10 is reduced, which is equivalent to shortening the calculation length La of the magnet of the motor rotor. The calculation length La of the magnet is calculated according to equation I:

$$La = \frac{6.1 \times 10^7}{a_\delta B_\delta A D_a^2} \cdot \frac{k_D}{\varphi} \cdot \frac{p}{n}$$

In the equation, La represents the calculation length of the magnet of the motor rotor; $a_\delta$ represents the pole-arc coefficient; A represents the electromagnetic load; $B_\delta$ represents the gap flux density; $D_a$ represents the outer diameter of the rotor; φ represents efficiency; p represents the number of pole pairs; n represents the rotating speed; and $k_D$ represents a constant.

Under the condition that other relevant calculation coefficients are unchanged, n and La are in a reverse ratio, which means when the overall magnetic field strength of the motor rotor assembly 10 reduces to shorten the calculation length La of the magnet of the motor rotor, the revolving speed n of the motor increases and the efficiency of the motor is enhanced. Due to the increase in the revolving speed of the motor, the output power of the motor is correspondingly enhanced, so that the motor runs in a highly efficient range.

When the load on the whole electric tricycle increases, the resistance generated by the load is applied to the motor shaft 20. In order to overcome the resistance, the motor power is automatically enhanced such that the current passing through the fixed coil on the inner side of the motor housing 1 increases, and then the fixed coil generates a greater magnetic field until the action force of the magnetic field can overcome the support force of the cylindrical spiral compression spring. Then, the cylindrical spiral compression spring is compressed, and the revolving support ring 111 rotates by a certain angle relative to the fixed side discs 112 at the same time to narrow the staggered angle between the staggered pole pieces 30 on the surface of the fixed rotor 12 and the staggered pole pieces 30 on the surface of the rotary rotor 11, enhancing the overall magnetic field strength of the motor rotor assembly 10, equivalent to increasing the calculation length La of the magnet of the motor rotor. According to the above-mentioned equation I, the revolving speed n of the motor reduces correspondingly. In such circumstances, the output power is unchanged, so the torsional force and output torque of the motor are enhanced according to equation II for motor operation: output power=revolving speed*torsional force/9.55.

As the load increases continuously, the continuously larger compression on the cylindrical spiral compression spring leads to a larger angle of rotation of the revolving support ring 111 relative to the fixed side discs 112, a higher overall magnetic field strength of the motor rotor assembly 10, a larger La and a larger output torque of the motor until the maximum rotation a is reached. At this time, the staggered pole pieces 30 on the surface of the fixed rotor 12 and the staggered pole pieces 30 on the surface of the rotary rotor 11 form a circumferentially staggered angle of 0°. Both of the two angles above remain completely consistent, reaching the maximum output torque.

What is claimed is:

1. An automatically variable torque and speed motor for electrical tricycles, comprising a motor rotor assembly, the motor rotor assembly comprising a motor shaft, a fixed rotor and a rotary rotor;

the fixed rotor and the rotary rotor are arranged adjacently in turn along an axis of the motor shaft, wherein the fixed rotor and the rotary rotor are equal in diameter, staggered pole pieces are arranged in the same manner around the circumferential surface of a support of the fixed rotor and around the circumferential surface of a support of the rotary rotor, the staggered pole pieces include a plurality of N poles and S poles which are circumferentially arranged in turn in an alternative way on the excircle of each one of the supports;

the staggered pole pieces on the surface of the fixed rotor and the staggered pole pieces on the surface of the rotary rotor form a staggered angle (α) along the circumference;

wherein:
the support of the rotary rotor comprises a revolving support ring and two fixed side discs which are respectively arranged on the two sides of the revolving support ring, the two fixed side discs are both bushed on the motor shaft and are connected together through a bolt I, an elastic compression part is arranged in an inner cavity of the revolving support ring along a revolving direction, and the elastic compression part has one end arranged in an inner circle of the revolving support ring, and the other end arranged on a side wall, facing the inner cavity of the revolving support ring, of one of the fixed side discs;
the revolving support ring is provided with a C-shaped limiting mounting platform which extends toward the inner cavity thereof;
the bolt I passes along the direction parallel to the motor shaft through a locating bushing which is arranged in the inner cavity of the revolving support ring;
the elastic compression part has one end arranged in a C-shaped cavity of the C-shaped limiting mounting platform, and has the other end fixed at a fixing portion of the fixed side discs, and said fixing portion is extending from the fixed side discs toward the inner cavity of the revolving support ring; and
a back of the C-shaped limiting mounting platform contacts the locating bushing of the bolt I.

2. The automatically variable torque and speed motor for electrical tricycles according to claim 1, wherein the revolving support ring includes a middle support ring and side support rings that clamp the middle support ring from two sides, and the side support rings and the middle support ring are fixed and superimposed together through a plurality of bolts II.

3. The automatically variable torque and speed motor for electrical tricycles according to claim 1, wherein the elastic compression part is a cylindrical spiral compression spring; the fixed portion is a spring support bushing which is arranged on a surface of the fixed side discs and the said surface is towards the inner cavity of the revolving support ring; the cylindrical spiral compression spring is arranged along the revolving direction of the revolving support ring, and the cylindrical spiral compression spring has one end arranged in the C-shaped cavity of the C-shaped limiting mounting platform, and the other end fixed in a countersink of the spring support bushing.

4. The automatically variable torque and speed motor for electrical tricycles according to claim 3, wherein two groups of the cylindrical spiral compression springs, spring support bushings, C-shaped limiting mounting platforms and locating bushings are respectively arranged in the inner cavity of the revolving support ring, symmetric to the motor shaft.

5. The automatically variable torque and speed motor for electrical tricycles according to claim 1, wherein the circumferentially staggered angle ($\alpha$) formed between the staggered pole pieces on the surface of the fixed rotor and the staggered pole pieces on the surface of the rotary rotor is 15°.

6. The automatically variable torque and speed motor for electrical tricycles according to claim 1, wherein a first fixed side disc of the two fixed side discs faces the fixed rotor, the first fixed side disc further comprises an annular locating protrusion which extends towards the fixed rotor.

7. An automatically variable torque and speed motor for electrical tricycles, comprising a motor shaft, a fixed rotor and a rotary rotor;
the fixed rotor and the rotary rotor are arranged adjacently in turn along an axis of the motor shaft, wherein the fixed rotor and the rotary rotor are equal in diameter, staggered pole pieces are arranged in the same manner around the circumferential surface of a support of the fixed rotor and around the circumferential surface of a support of the rotary rotor, the staggered pole pieces include a plurality of N poles and S poles which are circumferentially arranged in turn in an alternative way on the excircle of each one of the supports;
the staggered pole pieces on the surface of the fixed rotor and the staggered pole pieces on the surface of the rotary rotor form a staggered angle ($\alpha$) along the circumference;
wherein the support of the rotary rotor comprises a revolving support ring and two fixed side discs which are respectively arranged on the two sides of the revolving support ring, the two fixed side discs are both bushed on the motor shaft and are connected together through a bolt I, an elastic compression part is arranged in an inner cavity of the revolving support ring along a revolving direction, and the elastic compression part has one end arranged in an inner circle of the revolving support ring, and the other end arranged on a side wall, facing the inner cavity of the revolving support ring, of one of the fixed side discs, the fixed side discs are embedded on the revolving support ring; and a wear ring is arranged between the revolving support ring and each one of the fixed side discs; each one of the wear rings is clamped and fixed with a groove on the revolving support ring through a protrusion, and the excircle of each one of the fixed side discs is matched and installed on the step of the inner circle of each corresponding one of the wear rings.

8. The automatically variable torque and speed motor for electrical tricycles according to claim 7, wherein the revolving support ring is provided with a C-shaped limiting mounting platform which extends toward the inner cavity thereof;
the bolt I passes along the direction parallel to the motor shaft through a locating bushing which is arranged in the inner cavity of the revolving support ring;
the elastic compression part has one end arranged in a C-shaped cavity of the C-shaped limiting mounting platform, and has the other end fixed at a fixing portion of the fixed side discs, and the said fixing portion is extending from the fixed side discs toward the inner cavity of the revolving support ring; and
a back of the C-shaped limiting mounting platform contacts the locating bushing of the bolt I.

9. The automatically variable torque and speed motor for electrical tricycles according to claim 7, wherein the revolving support ring includes a middle support ring and side support rings that clamp the middle support ring from two sides, and the side support rings and the middle support ring are fixed and superimposed together through a plurality of bolts II.

10. The automatically variable torque and speed motor for electrical tricycles according to claim 7, wherein the elastic compression part is a cylindrical spiral compression spring; the fixed portion is a spring support bushing which is arranged on a surface of the fixed side discs and the said surface is towards the inner cavity of the revolving support ring; the cylindrical spiral compression spring is arranged along the revolving direction of the revolving support ring, and the cylindrical spiral compression spring has one end arranged in the C-shaped cavity of the C-shaped limiting mounting platform, and the other end fixed in a countersink of the spring support bushing.

11. The automatically variable torque and speed motor for electrical tricycles according to claim 10, wherein two groups of the cylindrical spiral compression springs, spring support bushings, C-shaped limiting mounting platforms and locating bushings are respectively arranged in the inner cavity of the revolving support ring, symmetric to the motor shaft.

12. The automatically variable torque and speed motor for electrical tricycles according to claim 7, wherein the circumferentially staggered angle ($\alpha$) formed between the staggered pole pieces on the surface of the fixed rotor and the staggered pole pieces on the surface of the rotary rotor is 15°.

13. The automatically variable torque and speed motor for electrical tricycles according to claim 7, wherein a first fixed side disc of the two fixed side discs faces the fixed rotor, the first fixed side disc further comprises an annular locating protrusion which extends towards the fixed rotor.

* * * * *